(12) United States Patent
Saghiri et al.

(10) Patent No.: US 11,344,394 B2
(45) Date of Patent: May 31, 2022

(54) ELECTROMAGNETIC TOOTHBRUSH

(71) Applicants: Mohammad Ali Saghiri, Madison, WI (US); Ali Mohammad Saghiri, Tehran (IR); Armen Asatourian, Madison, WI (US)

(72) Inventors: Mohammad Ali Saghiri, Madison, WI (US); Ali Mohammad Saghiri, Tehran (IR); Armen Asatourian, Madison, WI (US)

(*) Notice: Subject to any disclaimer, the term of this patent is extended or adjusted under 35 U.S.C. 154(b) by 522 days.

(21) Appl. No.: 15/885,663

(22) Filed: Jan. 31, 2018

(65) Prior Publication Data
US 2019/0231497 A1 Aug. 1, 2019

(51) Int. Cl.
*A61C 17/22* (2006.01)
*A61C 17/24* (2006.01)
*A46B 15/00* (2006.01)

(52) U.S. Cl.
CPC ........ *A61C 17/221* (2013.01); *A46B 15/0004* (2013.01); *A61C 17/222* (2013.01); *A61C 17/228* (2013.01); *A61C 17/24* (2013.01)

(58) Field of Classification Search
CPC ... A61C 17/221; A61C 17/228; A61C 17/222; A61C 17/24; A46B 15/0004; A46B 9/045
USPC ....................................................... 433/216
See application file for complete search history.

(56) References Cited

U.S. PATENT DOCUMENTS

| | | | |
|---|---|---|---|
| 1,644,465 A | 10/1927 | Chott | |
| 2,709,227 A | 5/1955 | Foley et al. | |
| 3,703,037 A | 11/1972 | Robinson | |
| 3,782,799 A | 1/1974 | Hansen | |
| 4,011,616 A * | 3/1977 | Kennedy | A46B 9/045 |
| | | | 15/21.1 |
| 4,759,635 A | 7/1988 | MacMichael et al. | |
| 4,955,393 A | 9/1990 | Adell | |

(Continued)

FOREIGN PATENT DOCUMENTS

| | | |
|---|---|---|
| CN | 2124686 | 12/1992 |
| EP | 1731068 | 12/2006 |

OTHER PUBLICATIONS

Andeanwire, Dent-Chew Brush, Clean Bite—Edible, single use, patented toothbrush, Jun. 9, 2016, http://andeanwire.com/wp.dent-chew-brush-clean-bite-edible-single-use-patented-toothbrush-for-use-primarily-by-schools-military-disaster-relief-and-as-an-oral-delivery-system-for-vitamins/.

(Continued)

*Primary Examiner* — Matthew M Nelson
(74) *Attorney, Agent, or Firm* — Lieberman & Brandsdorfer, LLC

(57) ABSTRACT

A magnetically controlled abrasive system (MCAS) having a magnetic system to manipulate a magnetically controlled unit is provided. More specifically, a track member is operatively coupled to a first magnetic unit and a first surface of a first body. The track member facilitates movement of the first magnetic unit with respect to the first body. A second body is positioned proximal to the first body. More specifically, at least one abrasive protrusion is operatively coupled to a second surface of the second body and a second magnetic unit is operatively coupled to the second body. The first magnetic unit generates a magnetic field which interacts with the second magnetic unit. The interaction controls movement of the second body including movement of the at least one abrasive protrusion positioned in communication with the second body.

11 Claims, 12 Drawing Sheets

(56) References Cited

U.S. PATENT DOCUMENTS

| | | |
|---|---|---|
| 5,163,566 A | 11/1992 | Hempel |
| 5,314,333 A | 5/1994 | Irmer et al. |
| 5,864,911 A * | 2/1999 | Arnoux .................. A61C 17/26 15/23 |
| 6,062,233 A | 5/2000 | Williams |
| 6,220,772 B1 | 4/2001 | Taylor |
| 6,357,907 B1 | 3/2002 | Cleveland et al. |
| 6,504,438 B1 | 1/2003 | Chang et al. |
| 6,575,203 B2 | 6/2003 | Hall et al. |
| 6,782,999 B1 | 8/2004 | McCoy et al. |
| 6,786,732 B2 | 9/2004 | Savill et al. |
| 7,111,350 B2 | 9/2006 | Blackman et al. |
| 7,168,122 B1 | 1/2007 | Riddell |
| 7,867,172 B1 | 1/2011 | Baruti et al. |
| 8,292,624 B2 * | 10/2012 | Gallagher, Jr. .... A46B 11/0003 433/216 |
| 8,308,651 B1 | 11/2012 | Baruti |
| 8,459,383 B1 * | 6/2013 | Burget .................... B60B 19/14 180/7.1 |
| 8,500,446 B2 | 8/2013 | Lowe |
| 8,600,600 B2 | 12/2013 | Jung |
| 8,690,579 B2 | 4/2014 | Ikkink et al. |
| 8,881,332 B2 | 11/2014 | Noble et al. |
| 8,943,634 B2 | 2/2015 | Sokol et al. |
| 2007/0235039 A1 | 10/2007 | Gottsch |
| 2008/0020352 A1 | 1/2008 | Hilscher et al. |
| 2009/0188729 A1 | 7/2009 | Berry et al. |
| 2011/0136070 A1 | 6/2011 | Rubin et al. |
| 2011/0136081 A1 | 6/2011 | Micali |
| 2013/0151043 A1 | 6/2013 | Jung |
| 2013/0323669 A1 | 12/2013 | Lowe |
| 2014/0023983 A1 | 1/2014 | Lowe et al. |
| 2014/0065588 A1 | 3/2014 | Jacobson et al. |
| 2014/0310900 A1 | 10/2014 | Curry et al. |
| 2015/0173856 A1 * | 6/2015 | Lowe ....................... A61C 7/00 433/24 |
| 2017/0027675 A1 * | 2/2017 | Nahshon ................ A61N 1/325 |
| 2017/0173353 A1 * | 6/2017 | Demarest ............... A61C 19/063 |
| 2019/0231497 A1 * | 8/2019 | Saghiri ................ A61C 17/221 |
| 2019/0282348 A1 * | 9/2019 | Musialek ........... A61C 17/0211 |

OTHER PUBLICATIONS

Blizzident, perfectly clean teeth, www.blizzdent.com, 2013.
Lobre et al., Pain Control In Orthodontics Using Vibration, Itch & Pain, 2016:3: e1165. doi: 10.14800/ip.1165. pp. 1-6, Feb. 1, 2016.

* cited by examiner

ELECTROMAGNETIC TOOTHBRUSH

BACKGROUND

The present embodiments relate to a magnetically controlled abrasive system. More specifically, the embodiments relate utilizing a magnetic system to manipulate a magnetically controlled abrasive unit.

Dental caries, also known as cavities, are considered as the most prevalent infectious disease worldwide. There are various factors impacting on incidence of dental caries including: cariogenic bacteria, dietary habit, and oral hygiene. The cariogenic bacteria are acquired from the environment and daily diet after born and become a commensal habitant of oral cavity. These acquired bacterial species accumulate on the tooth surface to form dental plaque, which is able to cause dental caries by producing lactic acid. These cariogenic bacteria are not fully controllable and patients can not eliminate them completely. However, other factors, such as dietary habit and oral hygiene, can be controlled and monitored by patients in order to lower the risk of dental caries. Regarding dietary habit, patients are instructed to consume lower amount of fermentable carbohydrates to decrease cariogenic reactions in oral cavity. The fermentable carbohydrates are used by cariogenic bacteria and turn into lactic acid, which can demineralize the tooth enamel causing dental decay or caries. Accordingly, by reducing consumption of fermentable carbohydrates the risk of dental caries can be decreased.

Basic oral hygiene methods include tooth brushing and dental flossing, which clean tooth surfaces and remove dental plaque accumulated on tooth surfaces. Beside these basic methods, there are other supplementary methods such as using anti-bacterial mouth rinses, fluoride mouth rinses, tooth picks, or sugar free chewing gums, which are not as effective as the basic methods and should be used in combination with the basic methods. Between basic methods of oral health care, tooth brushing has what some consider to be the most important effect in removing the dental plaque.

SUMMARY

A system and method are provided for a magnetic system to manipulate a magnetically controlled abrasive unit.

In one aspect, a system is provided with a first body to manipulate a position and/or orientation of a second body. More specifically, a track member is operatively coupled to a first magnetic unit and a first surface of the first body. The track member facilitates movement of the first magnetic unit with respect to the first body. A second body is positioned proximal to the first body. More specifically, at least one abrasive protrusion is operatively coupled to a second surface of the second body and a second magnetic unit is operatively coupled to the second body. The first magnetic unit generates a magnetic field which interacts with the second magnetic unit. The interaction controls movement of the second body including movement of the at least one abrasive protrusion.

In another aspect, a method is provided to manipulate a position and/or orientation of a second body. The first body comprises a track member operatively coupled to a first magnetic unit and a first surface of the first body. The track member facilitates movement of the first magnetic unit with respect to the first body. A second body is positioned proximal to the first body. More specifically, at least one abrasive protrusion is operatively coupled to a second surface of the second body and a second magnetic unit is operatively coupled to the second body. A magnetic field, generated by the first magnetic unit, interacts with the second magnetic unit. Movement of the second body, including movement of the at least one abrasive protrusion, is controlled by the interaction. A force is exerted, by the at least one abrasive protrusion, responsive to the movement.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The foregoing and other features, and advantages of the embodiments are apparent from the following detailed description taken in conjunction with the accompanying drawings in which:

DETAILED DESCRIPTION

Figure 1:
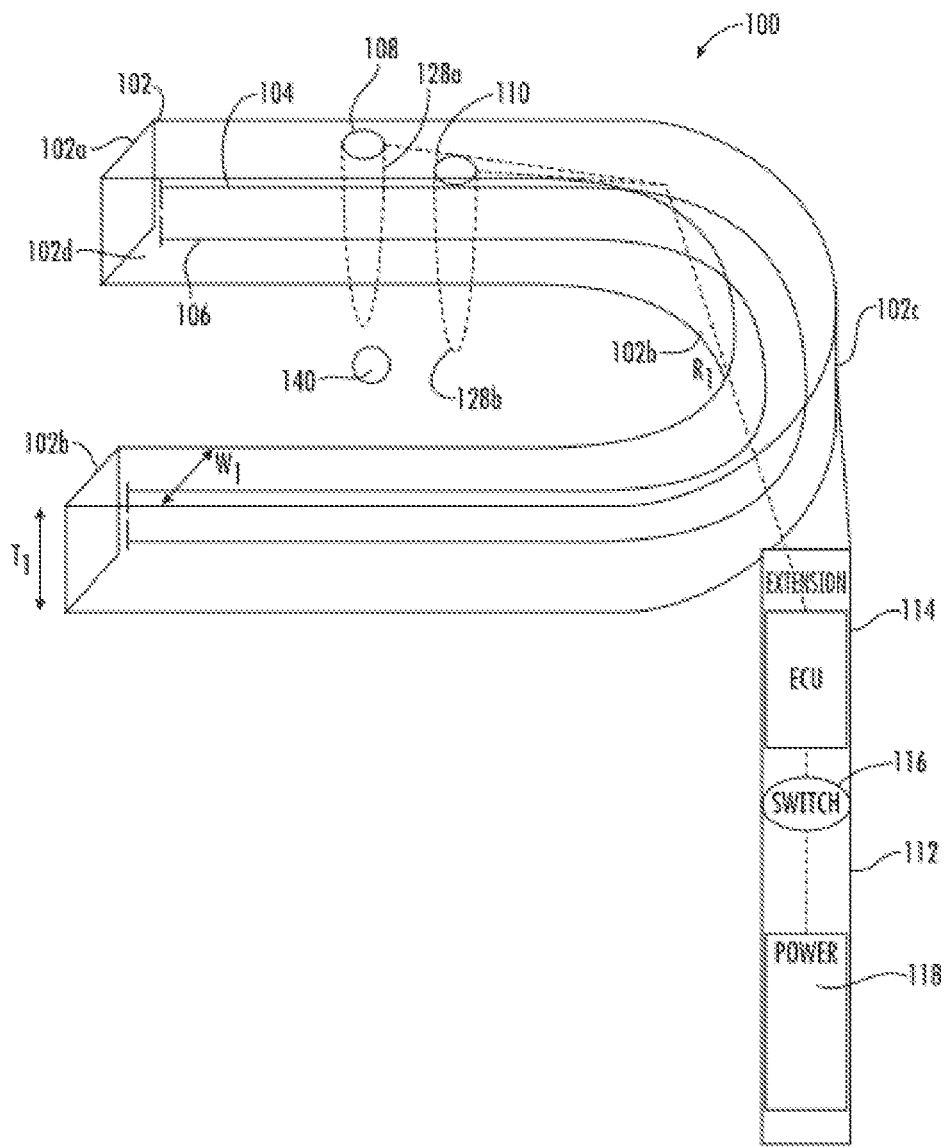
FIG. 1 depicts a block diagram illustrating a magnetically controlled abrasive system.

It will be readily understood that the components of the present embodiments, as generally described and illustrated in the Figures herein, may be arranged and designed in a wide variety of different configurations. Thus, the following detailed description of the embodiments of the apparatus, system, and method of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment of the present embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and illustrates certain selected embodiments of devices, systems, and processes that are consistent with the embodiments as claimed herein.

Other than in any operating examples, or where otherwise indicated, all numbers expressing, for example, quantities of ingredients used in the specification and claims are to be understood as being modified in all instances by the term "about". The modifier "about" used in connection with a quantity is inclusive of the stated value and has the meaning dictated by the context (e.g., includes the degree of error associated with measurement of the particular quantity). Accordingly, unless indicated to the contrary, the numerical parameters set forth in the following specification and attached claims are approximations that may vary depending upon the desired properties to be obtained. At the very least, and not as an attempt to limit the application of the doctrine of equivalents to the scope of the claims, each numerical parameter should at least be construed in light of the number of reported significant digits by applying ordinary rounding techniques.

Unless the meaning is clearly to the contrary, all references made herein to ranges are to be understood as inclusive of the endpoints of the ranges. Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

A magnetically controlled abrasive system (MCAS) that is able to clean and/or polish a surface such as remove dental plaque from a surface of a tooth is provided. In one embodiment, the MCAS abrades a gingival third of buccal surface(s) and a lingual surface(s) of each tooth in a mouth.

Referring to FIG. 1 a block diagram is provided illustrating a magnetically controlled abrasive system. As shown, a body (102) is provided to interface with a periphery of an upper and/or lower jaw. The body (102) is provided with several portions, including a first portion (102a), a second portion (102b) positioned distal from the first portion (102a), and a third portion (102c) positioned between the first and second portions, (102a) and (102b), respectively. In one embodiment, the first and second portions, (102a) and (102b), respectively, are relatively linear and the third portion has a curve which follows radius ($R_1$) such that the body (102) is in a U-shape. In one embodiment, the body (102) has a shape which engages the maxillary and mandibular arches of the upper and/or lower jaw(s). In one embodiment, the first and second portions, (102a) and (102b), respectively, are positioned relatively parallel to each other. In one embodiment, the first and second portions, (102a) and (102b) are 20 centimeters in length and the third portion is 25 centimeters in length. In one embodiment, all three portions, (102a)-(102c) have a similar width ($W_1$) and a similar thickness ($T_1$). In one embodiment, the width ($W_1$) is 10 millimeters and the thickness ($T_1$) is 5 centimeters. Accordingly, the shape of the body (102), including the first, second, and third portions (102a), (102b), and (102c), respectively, is for illustration purposes only and should not be considered limiting.

The body (102) may comprise a material which does not distort and/or alter a magnetic field. For example, the material may be, but is not limited to, a plastic material, a non-magnetic material, a non-allergenic material, or a waterproof material. In one embodiment, the body (102) may comprise, but is not limited to, polyurethane, acrylonitrile butadiene styrene, and a thermoset polymer. In one embodiment, an antibacterial layer (not shown) may be added to the body (102). Accordingly, the body (102) may comprise a variety of materials which mitigate, if not eliminate, interference with a magnetic field.

As shown, the body (102) is provided with a first magnetic system (MS) (108) and in one embodiment, a second MS (110). Each MS, (108) and (110), is configured with functionality to generate a magnetic field as described in detail in FIG. 3 below. As shown, the first MS (108) generates a first magnetic field (128a) and the second MS (110) generates a second magnetic field (128b). The generated magnetic fields, (128a) and (128b), may be used to control an object (140), such as the magnetically controlled abrasive unit (MCAU) (140) as described in detail in FIG. 4 below, positioned proximal to the body (102) and that is responsive to one or both of the magnetic fields (128a) and (128b). A single MS, such as the first MS (108) or the second MS (110), may be used to control the object (140), and in one embodiment, at least two MSs, MS (108) and MS (110),may be used to control the object (140). Accordingly, the first and second MSs, (108) and (110), respectively, generate first and second magnetic fields (128a) and (128b), respectively, to control the MCAU (140).

As shown, a first track (104) is operatively coupled to the body (102) to support and facilitate movement of the first MS (108). The first track (104) physically supports the first MS (108) and enables the first MS (108) to move (e.g., change position and/or orientation) with respect to the body (102). Movement of the first MS (108) is in at least one degree of freedom, more preferably, in at least two degrees of freedom, and most preferably in at least three degrees of freedom. Similarly, a second track (106) is operatively coupled to the body (102) to support and facilitate the movement of the second MS (110). The second track (106) physically supports the second MS (110) and enables the second MS (110) to move (e.g., change positon and/or orientation) with respect to the body (102). Movement of the second MS (110) is in at least one degree of freedom, more preferably, in at least two degrees of freedom, and most preferably in at least three degrees of freedom. In one embodiment, the first and second tracks (104) and (106), respectively, comprise a bakelite polymer (e.g., polyoxybenzylmethylenglycolanhydride). In one embodiment, the body (102) comprises a cavity (102d) which contains the first and second tracks, (104) and (106), respectively and the first and second MSs, (108) and (110), respectively. Accordingly, the first and second tracks, (104) and (106), respectively support and facilitate movement of the first and second MSs, (108) and (110), respectively.

As supported by the first and second tracks, (104) and (106), respectively, each MS, (108) and (110), is provided with functionality to move with respect to the body (102) as shown and described in detail in FIGS. 2 and 3 below. Responsive to movement of the first MS (108), the first magnetic field (128a) changes position and/or orientation. Similarly, responsive to the movement of the second MS (110), the second magnetic field (128b) changes position and/or orientation. The object (140) is responsive to a magnetic field. As such, the change in position of the either and/or both of the first and second magnetic fields, (128a) and (128b), respectively, may effect a position, orientation, and/or force exerted by the object (140). Accordingly, the first and second MSs, (108) and (110), respectively, control the position and/or orientation of the object (140).

As shown, the body (102) is operatively coupled to an extension (112). A shape of the extension (112) is configured such that the extension (112) can physically support the body (102). In one embodiment, the extension (112) is engageable by an operator. In one embodiment, the extension (112) is affixed to a secondary surface (not shown). Accordingly, the shape and/or configuration of the extension (112) are for illustration purposes only and should not be considered limiting.

The extension (112) is provided with a plurality of functionality, such as an electrical control unit (ECU) (114), a switch (116), and a power source (118). The switch (116) is configured to enable and disable the functionality of the ECU (114). For example, when the switch is in the "on" position, the functionality of the ECU (114) is enabled and when the switch (116) is in the "off" position, the functionality of the ECU (114) is disabled. The switch (116) may be a switch type such as, but not limited to, a push button, a toggle, a selector, a joystick, a lever, and a pressure. The power source (118) may be, but is not limited to, a battery, a power adapter, and combination thereof. Accordingly, the configuration and position of the switch (116) and the power source (118) is for illustration purposes only and should not be considered limiting.

As shown, the ECU (114) is in electrical communication with the first and second MSs, (108) and (110), respectively, the switch (116), and the power source (118). The ECU (114) performs a variety of functions, including, but not limited to determining the location of each MS, (108) and (110), and controlling the movements (e.g., position and/or orientation changes) of the first and/or second MSs, (108) and (110), respectively. More specifically, the ECU (114) provides an electrical signal to the first and/or second MSs, (108) and (110), respectively. Responsive to the received electrical signal, the first and second MSs, (108) and (110), respectively, change position from a first position to a second position utilizing the respective first and/or second track, (108) and (110). In one embodiment, the first and second MSs, (108) and (110), respectively, may change orientation from a first orientation to a second orientation responsive to the received electrical signal. Similarly, in one embodiment, the ECU (114) may be local to the body (102) and in electrical communication with the first and second MSs (108) and (110), respectively, the switch (116) and the power source (118). Accordingly, regardless of the physical position of the ECU (114), either local to the body (102) or local to the extension (112), the ECU (114) may determine the current position and control position and/or orientation changes of each MS, (108) and (110), utilizing electrical signals.

The ECU (114) controls the first and second magnetic fields, (128a) and (128b), respectively, via the first and second MSs, (108) and (110), respectively. For example, the ECU (114) may control the position and/or orientation of the first and second magnetic fields, (128a) and (128b), via the position and/or orientation of the first and second MSs, (108) and (110), respectively. The ECU (114) is configured to control the strength of the electrical field generated by the first and second MSs, (108) and (110), respectively. The object (140) may change position and/or orientation responsive to a position change, orientation change, and/or field strength change of the first and second magnetic fields, (128a) and (128b), respectively. Accordingly, the ECU (114) controls the position and/or orientation of the object (140) utilizing the first and second magnetic fields, (128a) and (128b), respectively.

The ECU (114) may be controlled in a variety of manners. For example, the ECU (114) may be autonomous and control the first and second magnetic fields, (128a) and (128b), respectively, without any external control. In one embodiment, the ECU (114) may be passive and control the first and second magnetic fields, (128a) and (128b), respectively, responsive to an electronic signal(s) received from an external device (not shown). For example, the ECU (114) may be provided with Bluetooth, WiFi, another wireless communication, and/or a wired communication with the external device. In one embodiment, the external device may be a smart phone with a software application that sends electrical signals to the ECU (114) in order to control position, orientation, and/or strength of the first and second magnetic fields, (128a) and (128b), respectively, generated by the first and second MSs (108) and (110), respectively. Accordingly, the ECU (114) may autonomously or passively control the first and second magnetic fields, (128a) and (128b), respectively.

Control is divided into two paths, including mechanical and electrical. The mechanical control is via the first and second tracks, (104) and (106), respectively, and the electrical control is via the ECU (114). As shown, the ECU (114), also referred to herein interchangeably as a programming controller unit, is provided to direct cleaning and/or polishing associated with the (MCAS). Required cleaning and/or polishing information include spots that the object (140) should be directed towards by the magnetic members (108) and (110), and further described in FIG. 3. These spots are defined according to variables, including but not limited to age, sex, weight, and height, and dental values specific to a patient, including but not limited to, x-ray analysis, image processing, and finite element analysis. The controller unit (114) may be programmed to provide specific and appropriate cleaning and/or polishing. In one embodiment, the controller unit (114) may have at least two setting modes, including automatic and custom, with the automatic mode including data based on normal and low caries detention. Similarly, in one embodiment, the custom mode may be divided into categories, including abnormal dentition, such as orthodontic conditions, e.g. crowding, and abnormal maxillofacial conditions, e.g. cleft pallet. As shown, the controller unit (114) is in communication with track (106) of the apparatus (102). In one embodiment, the controller unit (114) is encased or enclosed in a material, such as a polymer or a Bakelite polymer (e.g., polyoxybenzylmethylenglycolanhydride). Similarly, in one embodiment, the controller unit (114) is operatively connected to the magnetic members (108) and (110) through a connection to the extension (112). For example, in one embodiment, the connection may be wireless or magnetic. Accordingly, the controller unit (114) is employed to direct the cleaning and/or polishing functionality.

Figure 2:
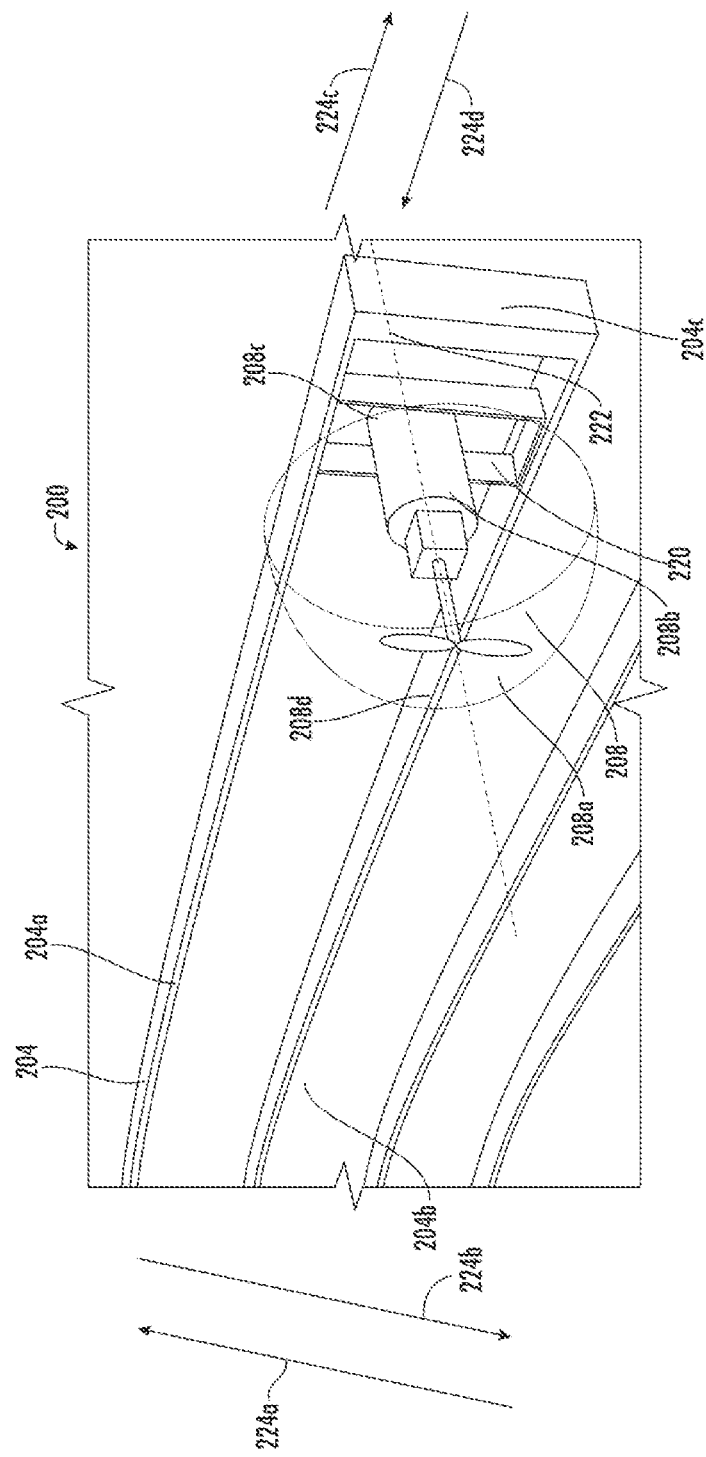
FIG. 2 depicts a block diagram illustrating an embodiment of the track to support and facilitate the movement of a magnetic system.

Referring to FIG. 2 a block diagram (200) is provided illustrating an embodiment of the track to support and facilitate movement of a magnetic system. As shown, a magnetic system (MS) (208) is provided in communication with a first track (204). The MS (208) has a cover (208a) and a base (208b). The base (208b) facilitates movement of the MS (208) in at least one degree of freedom with respect to the first track (204). Namely, the base (208b) facilitates a rotation of the MS (208) around axis (222) which extends from a first end (208c) of the MS (208) through an oppositely disposed second end (208d). In one embodiment, during the rotation of the MS (208), a position of the MS (208) with respect to the first track (208) and third track (220) remains unchanged. Accordingly, the MS (208) may be subject to rotation (e.g., orientation change).

As shown, the base (208b) is in communication with a third track (220) to support a position change of the MS (208) in at least one degree of freedom with respect to the first track (204). Namely, the third track (220) facilitates movement of the MS (208) in a first direction (224a) and/or in a second direction (224b). For example, the MS (208) moves towards a first side (204a) of the first track (204) utilizing the third track (220) when moving in the first direction (224a). Similarly, the MS (208) moves towards a second side (204b) of the first track (204) utilizing the third track (220) when moving in the second direction (224b). In one embodiment, during movement of the MS in the first and/or second directions, (224a) and (224b), respectively, a distance of the MS (208) remains unchanged with respect to a first end (204c) of the first track (204), wherein the first end (204c) extends from the first side (204a) to the second side (204b). Accordingly, the MS (208), supported by the third track (220), may be subject to a position change by moving in first and/or second directions, (224a) and (224b), respectively.

As shown, the first track (204) supports a position change of the MS (208) in at least one degree of freedom. Namely, the first track (204) facilitates movement of the MS (208) in a third direction (224c) and/or a fourth direction (224d). In one embodiment, the third direction (224c) and fourth direction (224d) are aligned with a length of the first track (220). For example, the MS (208) moves towards the first end (204c) utilizing the first track (204) when moving in the third direction (224c). Similarly, the MS (208) moves away from the first end (204c) utilizing the first track (204) when moving in the fourth direction (224d). In one embodiment, during movement of the MS (208) in the third and/or fourth directions, (224c) and (224d), respectively, a position of the MS (208) remains the same with respect to the third track (220). In one embodiment, the first track (204) supports the MS (208) in at least one degree of freedom. In one embodiment, the first track (204) supports the MS (208) in at least two degrees of freedom. Accordingly, the MS (208), supported by the first track (204), may be subject to a position change by moving in the third and/or fourth directions, (224c) and (224d), respectively.

Figure 3:
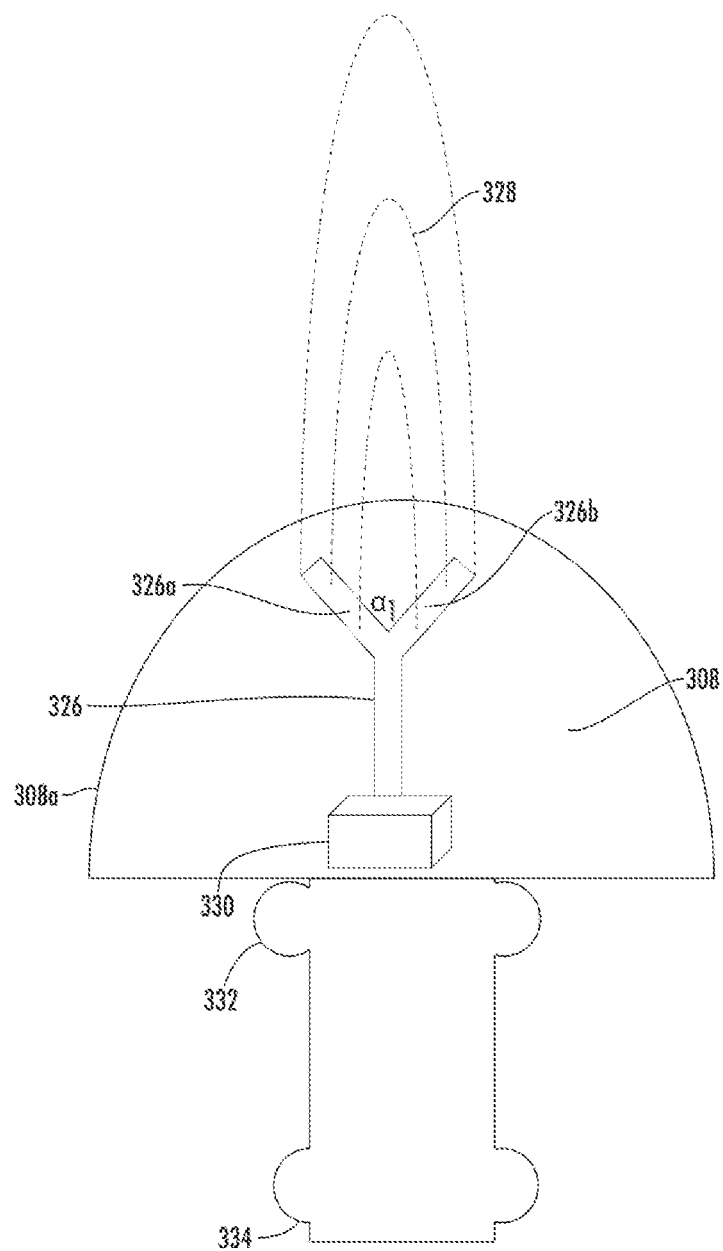
FIG. 3 depicts a block diagram illustrating an embodiment of a magnetic system.

Referring to FIG. 3 a block diagram (300) is provided illustrating an embodiment of a magnetic system. As shown, the magnetic system (MS) (308) has a cover (308a) and a plurality of motors to support movement of the MS (308), such as first motor (330), second motor (332), and third motor (334). Each motor, (330)-(334), facilitates movement of the MS (308) in at least one degree of freedom. For example, the first motor (330) supports a rotation of the MS (308) around axis (222) (e.g., orientation change) Similarly, the second motor (332) supports movement of the MS (308) in first and second directions, (224a) and (224b), respectively, (e.g., position change) utilizing the third track (220). The third motor (224) supports movement of the MS (308) in third and fourth directions, (224c) and (224d), respectively, (e.g., position change) utilizing the first track (204). Accordingly, the MS (308) is provided with motors, (330)-(334), to facilitate position and/or orientation changes of the MS (308).

The MS (308) is configured with a magnetic member (326) shown herein with a first pole (326a) and a second pole (326b). In one embodiment, the magnetic member (326) is a solenoid. The first and second poles, (326a) and (326b), respectively are different. For example, the first pole (326a) may be a north pole and the second pole (326b) may be a south pole. In another example, the first pole (326a) may be the south pole and the second pole (326b) may be the north pole. The designation of the poles is for illustration purposes only and should not be considered limiting.

Regardless of the pole configuration, the magnetic member (326) is configured to generate a magnetic field (328). As shown, the poles are positioned at a first angle ($\alpha_1$) relative to each other. The physical position of the poles (326a) and (326b) may be adjusted wherein the first angle ($\alpha_1$) dynamically changes. The change in the first angle ($\alpha_1$) affects the strength, position, and/or orientation of the magnetic field (328). In one embodiment, the first angle ($\alpha_1$) may be between 30 and 180 degrees. The position and/or orientation of the first and second poles, (326a) and (326b), affect the strength, position, and/or orientation of the magnetic field (328). In one embodiment, the strength of the magnetic field (328) may be controlled by an electrical signal applied to the first and/or second poles, (326a) and (326b), respectively. In one embodiment, the ECU (114) determines the polarization and position of the poles (326a) and (326b). Similarly, in one embodiment, the determination by the ECU (114) is based on one or more of the following factors: tooth alignment(s), position of the object (140), and torque of the object (140). The ECU is coupled to a set of program instructions, which in one embodiment is based on data in a dentometric library and associated dentition landmarks. In one embodiment, the ECU utilizes program instructions to individually or collectively direct the motors (330)-(334) to rotate the poles (326a) and (326b). This pole rotation effective changes the associated polarity. Accordingly, the first and/or second poles, (326a) and (326b) are configured to generate magnetic field (328), and to control the strength, position, and/or orientation thereof.

Figure 4:
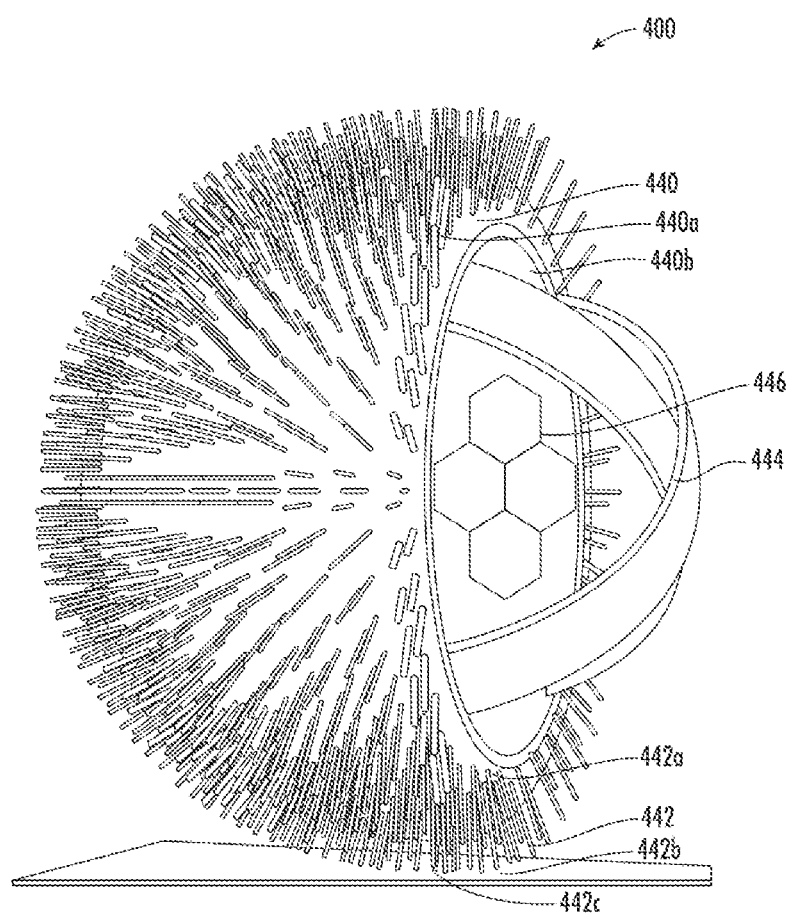
FIG. 4 depicts a block diagram illustrating an embodiment of a magnetically controlled abrasive unit.

Referring to FIG. 4, a block diagram (400) is provided illustrating an embodiment of a magnetically controlled abrasive unit. As shown, the magnetically controlled abrasive unit (MCAU) (440) is configured with a plurality of abrasive protrusions (442). Each protrusion has a proximal end (442a) and an oppositely disposed distal end (442b). Each proximal end (442a) is coupled to a first surface (440a) of the MCAU (440) and each distal end (442b) extends radially away from the first surface (440a). In one embodiment, the first surface (440a) comprises dupont polymer material, such as ethylene and ethyl acrylate, although in one embodiment, other polymer materials may be used, and as such the examples discussed herein should not be considered limiting. As known in the art, the protrusions (442) may be comprised of a variety of different materials, such as but not limited to, polyethylene type resins. In one embodiment, the protrusions (442) function as bristles.

The protrusions (442) individually have a cross-sectional shape in the form of, but not limited to, circular, oval, triangular, square, rectangular, parallelogram, trapezoidal, rhomboidal, pentagonal, and hexagonal. In one embodiment, each protrusion (442) has a textured surface (442c). For example, in one embodiment, the surface (442c) may have a rough texture. The protrusions (442) may be oriented in the same radial direction or different radial directions. In one embodiment, a first subset of the protrusions (442) may be oriented in a first radial direction and a second subset of the protrusions (442) may be oriented in a second radial direction, with the first and second radial directions being different. The protrusions (442) may have a variety of different configurations that may be used to abrade a secondary surface (not shown). Accordingly, the configuration of the protrusions (442) is for illustration purposes only and should not be considered limiting.

The dimension(s) and/or configuration of the MCAU (440) may depend on a plurality of factors. The factors may be based on the operator. For example, the factors may be, but are not limited to, age, head position, cooperation, mobility, and maxillofacial background disease. In one embodiment, the MCAU (440) has a diameter of between 1.5 millimeters and 1.5 centimeters. In one embodiment, the protrusions (442) have a distance extending from the proximal end (442a) to the distal end (442b) of 3 millimeters to 6 millimeters. Accordingly, the MCAU (440) can be provided in a variety of different configurations.

The MCAU (440) is configured with an internal support member (444). The support member (444) physically supports a shape of the MCAU (440). For example, in one embodiment, the support member (444) may physically support a spherical shape of the MCAU (444). The support member (444) may be comprised of a flexible and/or resilient material. In one embodiment, the support member (444) is comprised of a plastic. In one embodiment, the support member (444) is comprised of a flexible material that enables the shape of the MCAU (444) to temporarily change from a first shape to a second shape due to a force exerted on the MCAU (440). Upon lessening of the exerted force on the MCAU (440), the support member (444) facilitates a change of the MCAU (440) from the second shape back to the first shape. In one embodiment, the support member (444) comprises bakelite. Accordingly, the MCAU (440) and its material supports shape changes and re-establishes the supported shape after an applied force.

The MCAU (440) is configured with a magnetic property that is responsive to a magnetic field. For example, the MCAU (440) is configured with at least one magnet (446) or in on embodiment, a plurality of magnets (446). For descriptive purposes, the MCAU (440) is shown and described with a plurality of magnets. The magnets (446) are embedded within a second surface (440b), also referred to as an internal surface, of the MCAU (440). For example, the magnets (446) may be embedded within the MCAU (440) in communication with or operatively coupled to the second surface (440b) during injection molding of the surface (440b). In one embodiment, the magnets (446) are configured in a honeycomb pattern. Similarly, in one embodiment, the magnets (446) are a ferromagnetic material. In one embodiment, the magnets (446), or a subset of the magnets, are a permanent magnet. The configuration of the magnets (446) is for illustration purposes and should not be considered limiting.

A magnetic field acting on the MCAU (440) may change a position and/or orientation of the MCAU (440). For example, the magnets (446) within the MCAU (440) are either attracted to and/or repelled from at least one of the poles, (326a) and (326b), of the MS (334) due to the magnetic field (328). The attractive force and/or repelling force acts on the magnets (446), which in turn causes the MCAU (440) to change position and/or orientation. Accordingly, the MCAU (440) is responsive to a magnetic field due to the magnets (446) embedded within the MCAU (440).

Figure 5:
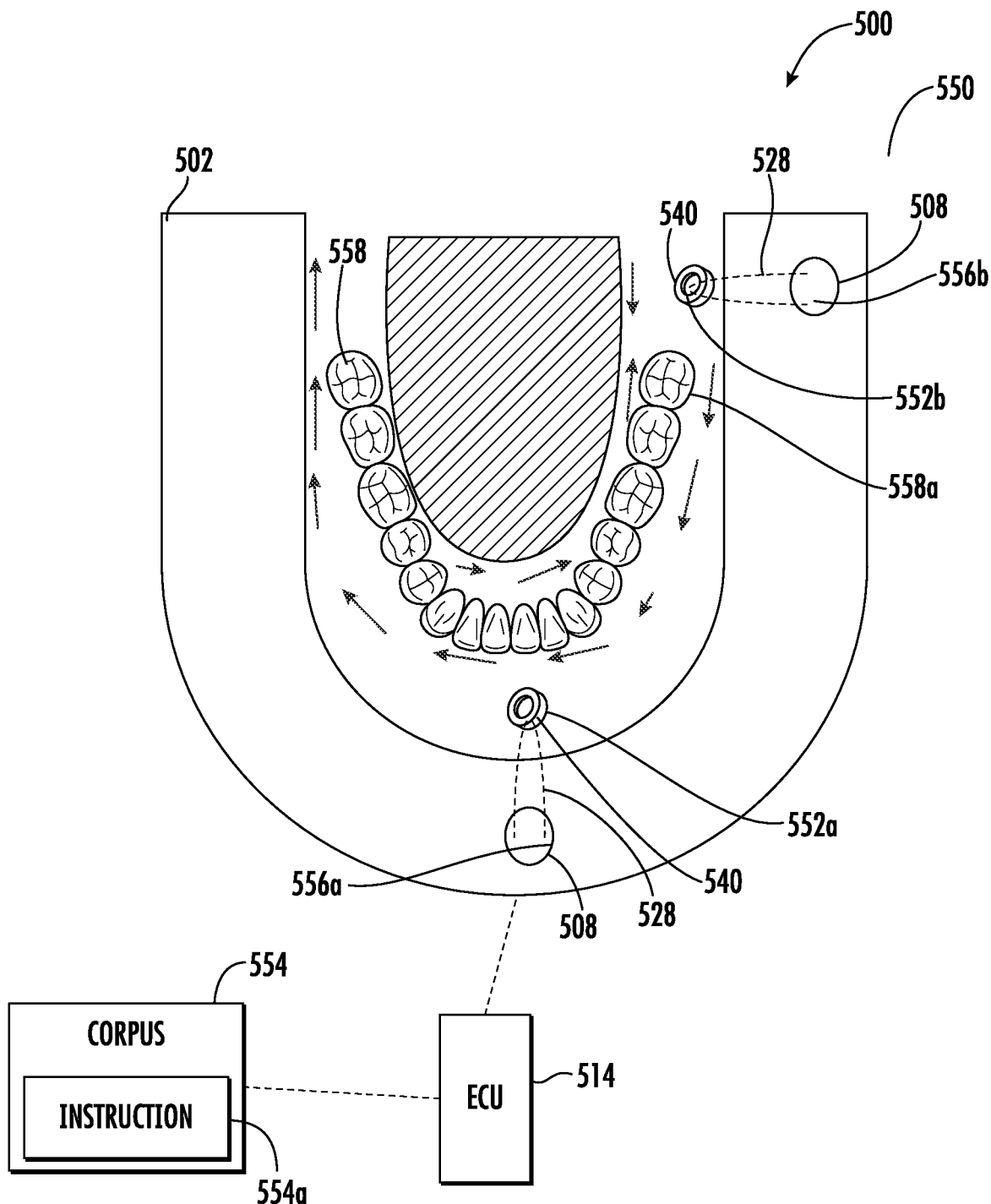
FIG. 5 depicts a flow chart illustrating a deployment of the magnetically controlled abrasive system.

Referring to FIG. 5 a block diagram (500) is provided illustrating deployment of the magnetically controlled abrasive system. As shown, the magnetically controlled abrasive system (MCAS) (550) includes a MCAU (540), such as the MCAU (440) illustrated in FIG. 4, and a body (502), such as the body (102) illustrated in FIG. 1. An ECU (514) is provided in communication with the body (502) and enabled to initialize magnetic communication between the MCAU (540) and the MS (508) of body (502). As shown, the MCAU (540) is placed in a first position (552a) with respect to the body (502). In one embodiment, the first positon (552a) is between central teeth (558a). The MS (508), in the third position (556a) with respect to the body (502), initializes magnetic communication with the MCAU (540) utilizing magnetic field (528). In one embodiment, the initialization includes an alignment of the first and second poles, (326a) and (326b), respectively, within the MS (508) with the magnets (446) within MCAU (540). Accordingly, the MCAU (540) is in magnetic communication with the MS (508) within body (502).

Once the magnetic communication between the MCAU (540) and the MS (508) is initialized, the ECU (514) utilizes the MS (508) to control the position and/or orientation of the MCAU (540) utilizing magnetic field (528). For example, responsive to movement of the MS (508) from the third position (556a) to a fourth position (556b), the magnetic field (528) dynamically changes position and/or orientation thereby causing movement of the MCAU (540) from the first position (552a) to a second position (552b). Responsive to the movement, the MCAU (540) engages the surface (558a) of teeth (558) and exerts a force on teeth (558). In one embodiment, the protrusions (442) abrade the surface (558a). In one embodiment, movement of the MCAU (540) is facilitated by the MS (508). In one embodiment, the movement of the MCAU (540) is facilitated by at least two MSs. Accordingly, controlling the MS (508) controls the position and/or orientation of the MCAU (540) thereby facilitating an abrasion of a surface(s) (558a) of one or more teeth (558).

The ECU (514) may be in communication with a corpus (554). The corpus (554) includes data for the position and/or orientation of the MCAU (540). For example, the corpus (554) may include an instruction (554a) for the ECU (514) which defines how to control the position and/or orientation of the MS (508) and/or the strength of the magnetic field (528). The instruction (554a) may include a scheduled set of steps in order to properly abrade a surface, such as surface (558a). For example, the instruction (554a) may include a series of positions and orientations for the MS (508), a speed to travel between positons and/or orientations, and a dwell time at each position and orientation combination, e.g. location. The instructions (554a) may be variable according to one or more parameters such as, but not limited to, age, gender, weight, height, quantity of dental caries, orthodontic problems (e.g., abnormal maxillofacial conditions such as cleft pallet, etc.) and a calibration value(s). In one embodiment, the instruction (554a) includes a series of positons and orientations for at least two MSs. In one embodiment, the instruction (554a) enables the MCAU (540) to abrade at least 96 surfaces (e.g., 32 teeth in a mouth and three surfaces on each tooth). Accordingly, the instructions (554a) provided may control one or more MSs to utilize the MCAU (540) to abrade surfaces.

Figure 6:
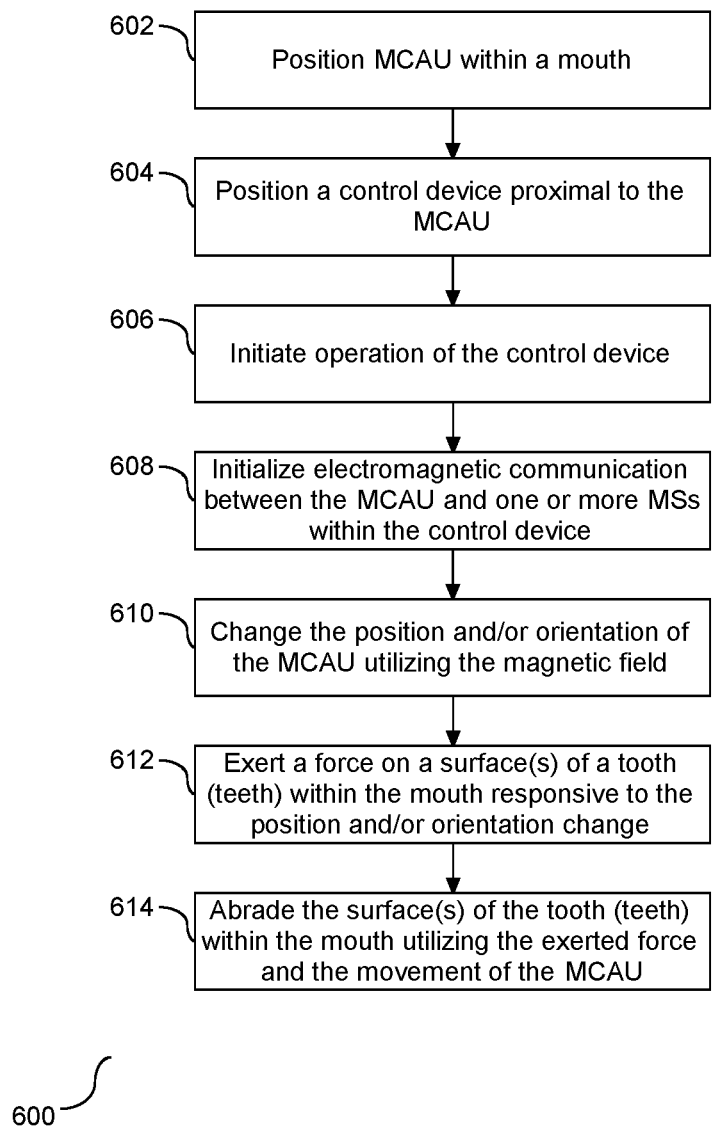
FIG. 6 depicts a flow chart illustrating operation of the magnetically controlled abrasive system.

Referring to FIG. 6 a flow chart (600) is provided illustrating operation of the magnetically controlled abrasive system. As shown, a magnetically controlled abrasive unit (MCAU) with one or more bristles is positioned within a mouth (602). A control device is positioned proximal to the MCAU (604). The operation of the control device is initiated (606). More specifically, magnetic communication between one or more magnetic systems (MS) within the control device and the MCAU is initialized utilizing a magnetic field (608) (e.g., the MS is synched with the MCAU). In one embodiment, the initiation at step (606) includes configuring a switch in an on position. Accordingly, the MCAU and control device are synched utilizing a magnetic field.

The MCAU is controlled utilizing the magnetic field, including changing the position and/or orientation of the MCAU (610). Responsive to the position and/or orientation change, a force is exerted by the MCAU on a secondary surface(s) (612). For example, in one embodiment, the change at step (612) enables the bristles of the MCAU to exert a force on a tooth (teeth) within the mouth. The secondary surface(s) are abraded (e.g., cleaned) utilizing the exerted force and the movement of the MCAU (614). In one embodiment, a material is added to enhance the abrasion process at step (614). For example, a detergent may be added to a surface of the MCAU. Accordingly, the magnetically controlled abrasive system of the MCAU and the control device may be used to clean surfaces of teeth.

Figure 7:
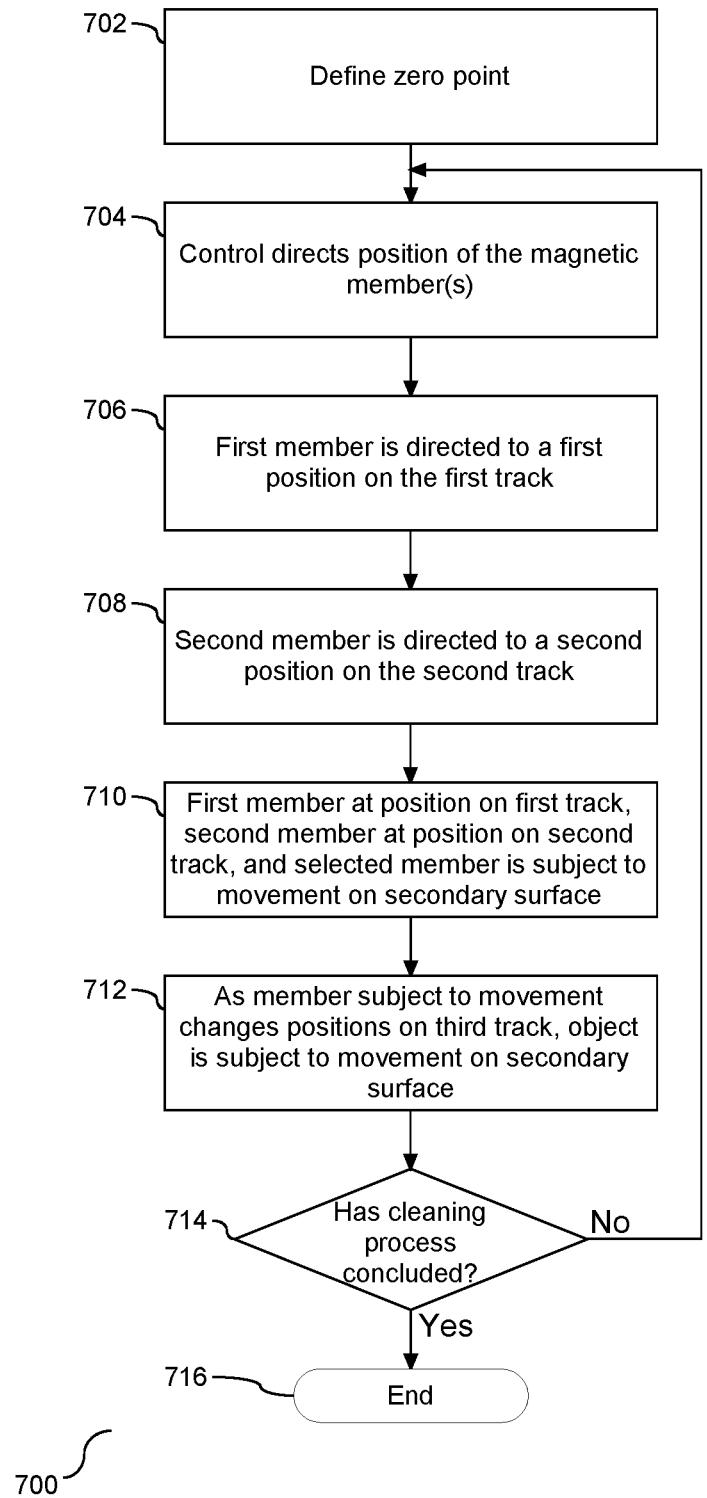
FIG. 7 depicts a flow chart illustrating communication between a magnetic system and a magnetically controlled abrasive unit.

Referring to FIG. 7, a flow chart is provided illustrating magnetic communication between a magnetic system and a magnetically controlled abrasive unit. As shown and described in FIG. 1, there are two magnetic members and two tracks. In addition, as shown in FIG. 2, each magnetic member has movement along a primary track (104) and (106), and a secondary track (220). At the beginning of the cleaning/polishing, a zero point is defined (702). This is demonstrated by controller unit instructing the magnetic members to hold the object (140) at a middle line of a buccal surface of the maxillary central teeth. Movements of the object are directed by movements of the magnetic members. Together, the magnetic members and their associated solenoids create a magnetic field. Following step (702), the controller directs the position of the magnetic member(s) (704). More specifically, at step (704), the first member is directed to a first position on the first track (706), and the second member is directed to a second position on the second track (708). Each of the first and second members has an associated third track. The area to be cleaned will instruct which member remains stationary and which member is subject to movement on their associated third track. When the first and second members are at the set positions on the first and second tracks, respectively, the selected member is subject to movement on their associated third track (710). The position(s) of the first and second members create a magnetic field that is connected to electrodes within the object (140). The member that remains stationary matches the object against a surface of the tooth and the member that is subject to movement on the third track causes movement of the object, e.g. movement of the member on the third track causes movement of the object on the tooth surface. As the member subject to movement changes position along their third track, the object is subject to movement along the secondary surface, e.g. surface of the tooth, (712). When the position of the member subject to movement returns to stationary, the ECU (114), also referred to herein as a controller unit, determines if the control and cleaning process has reached its conclusion (714). A negative response is followed by a return to step (704), and a positive response concludes the cleaning/polishing process (716). Accordingly, the ECU (114) functions to manage the position and position change of the magnetic member along the first and second tracks, and along their respective third tracks.

Figure 8:
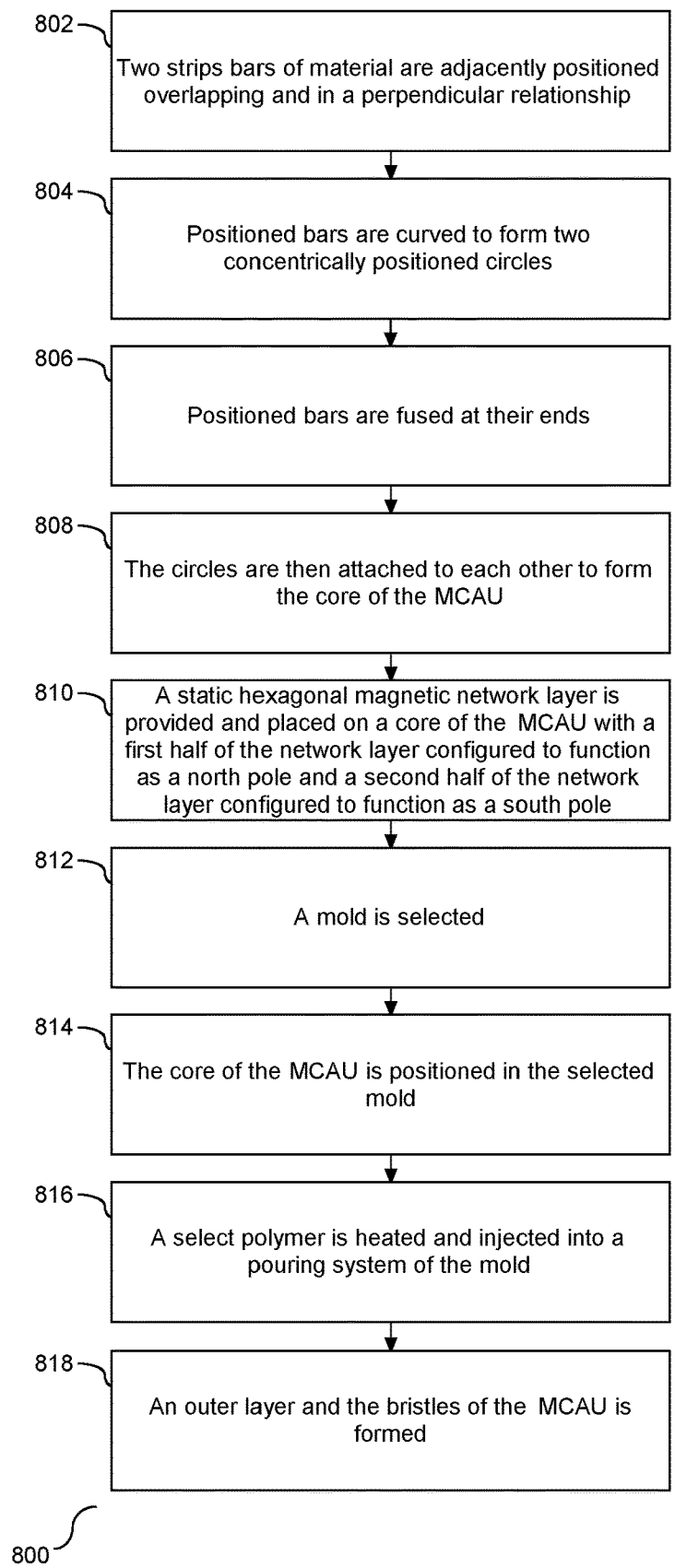
FIG. 8 depicts a flow chart illustrating construction of the object referred to herein as a magnetically controlled abrasive unit (MCAU).

Referring to FIG. 8, a flow chart (800) is provided illustrating construction of the object referred to herein as a magnetically controlled abrasive unit (MCAU). Two strips bars of material are adjacently positioned overlapping and in a perpendicular relationship (802). In one embodiment, the size and dimensions of the bars of material is 15×2×1 mm. Similarly, in one embodiment, the bars of material are comprised of a bakelite polymer (e.g., polyoxybenzylmethylenglycolanhydride). The positioned bars are curved to form two concentrically positioned circles (804). The positioned bars are fused at their ends (806), which in one embodiment includes subjecting the ends to heat treatment. The circles are then attached to each other to form the core of the MCAU (808). In one embodiment, the attachment at step (808) takes place by heat treatment. A static hexagonal magnetic network layer is provided and placed on a core of the MCAU with first half of the network layer configured to function as a north pole and a second half of the network layer configured to function as a south pole (810). Accordingly, following step (810) a core of the MCAU is completed.

It is understood in the art of cleaning, that different bristle configurations and density, will yield different cleaning results. A plurality of molds is provided to address the different configurations. In one embodiment, there are three different molds, although this quantity should not be considered limiting. A first mold is referred to herein to create a low density MCAU, to create bristles having a length of about 5 mm and a diameter of about 0.02 mm, with the bristles oriented in a single direction. A second mold is referred to herein to create a medium density MCAU, to create bristles having a length of about 5 mm and a diameter of about 0.04 mm, with the bristles oriented in at least two directions. A third mold is referred to herein to create a high density MCAU, to create bristle having a length of about 5 mm and a diameter of about 0.06 mm, with the bristles oriented in three or four directions. In one embodiment, the mold is comprised of a stainless steel material. Following step (810), a mold is selected (812), the core of the MCAU is positioned in the selected mold (814), and a select polymer is heated and injected into a pouring system of the mold (816), to form an outer layer and the bristles of the MCAU (818). In one embodiment, the first mold creates a MCAU for soft or minimal resistance cleaning, the second mold creates a MCAU for medium resistance cleaning, and the third mold creates a MCAU for hard resistance cleaning. In one embodiment, the same polymer material may be employed for each of the first, second, and third molds. Similarly, in one embodiment, different polymers may be employed for one or more of the first, second, and third molds. For example, in one embodiment, a polymer is a material strength is selected for the mold depending on the desired resistance to be attained by the MCAU. Accordingly, following step (818) and curing of the polymer, the MCAU is formed.

Figure 9:
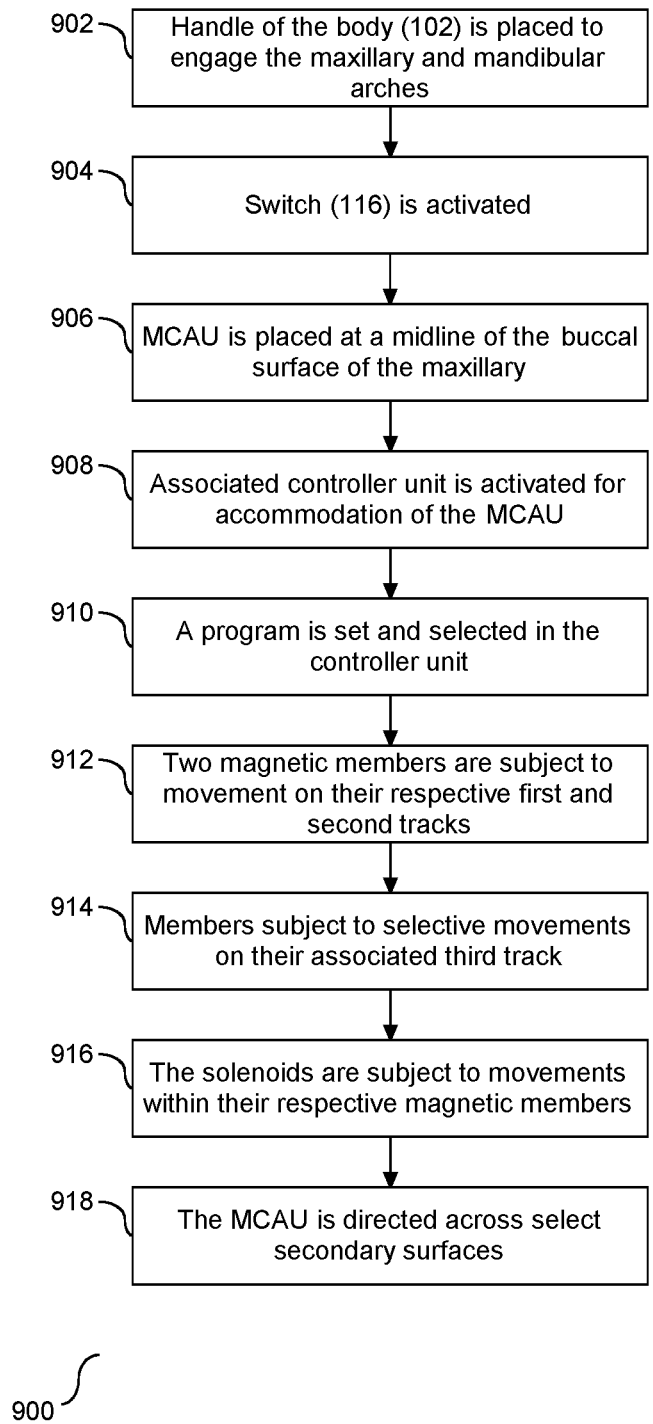
FIG. 9 depicts a flow chart illustrating operation of the magnetically controlled abrasive system.

Referring to FIG. 9, a flow chart (900) is provided illustrating operation of the magnetically controlled abrasive system. A handle of the body (102) is placed to engage the maxillary and mandibular arches (902). Following the engagement at step (902), the switch (116) is activated (904), e.g. turned on. Thereafter, the MCAU is placed at a midline of the buccal surface of the maxillary (906). The system is calibrated with the MCAU and synchronized based on the midline and/or an associated dentometric library, including one or more defined landmarks according to a dentition. The ECU (114) is activated for accommodation of the MCAU (908), including use of at least two solenoids and three micro-electro-motors for movement of the MCAU along three axes, e.g. roll, pitch, and yaw. According to a program set and selected in the ECU (910), the two magnetic members are subject to movement on their respect first and second tracks (912), and selective movements on their associated third track (914). More specifically, direction of the horizontal and vertical movements of the solenoids by the vertical and horizontal micro-electro-motors, the respective solenoids are subject to rotational movements by the R micro-electro-motors, e.g. the respective solenoids are subject to rotational movement within their respective magnetic members (916). According to movement of the solenoids, the magnetic field between solenoids, e.g. dynamic magnets, and the electrodes and magnetic network into the MCAU, e.g. static magnet, the MCAU is directed across select secondary surfaces, e.g. surfaces of the teeth, with the bristles of the MCAU effectively cleaning the secondary surfaces (918). Accordingly, the dynamic characteristics of the solenoids and the static characteristic(s) of the magnetic network of the MCAU, the bristles of the MCAU communicate with one or more surfaces of the teeth to selectively subject the teeth to cleaning.

Aspects of the magnetically controlled abrasive system, as shown and described in FIGS. 1-9 employ one or more functional tools to effectively clean one or more secondary surfaces. As shown and described above, the MCAU may come in different configurations to provide different levels of secondary surface cleaning. Aspects of the functional tools, e.g. the first body, the second body, the controller unit, etc., and their associated functionality may be embodied or in communication with a computer system/server in a single location, or in one embodiment, may be configured in a cloud based system sharing computing resources. Connecting through a network of computer platforms enables and supports exchange of data. It is understood that each individual has unique dental and orthodontic needs. The network connection enables and supports exchange of associated dental and orthodontic data, including but not limited to, occlusion, missing teeth, orthodontic concerns, etc. Other relevant data may include, age, race, gender, body mass index, etc. The exchange of data supports communication of the individual's data across the network, and in one embodiment, receipt of information and procedure directions directed at efficacy of cleaning directed to the unique properties of the individual.

With references to FIG. 10, a block diagram (1000) is provided illustrating an example of a computer system/server (1002), hereinafter referred to as a host (1002) in communication with a cloud based support system, to implement the system and processes described above with respect to FIGS. 1-9. Host (1002) is operational with numerous other general purpose or special purpose computing system environments or configurations. Examples of well-known computing systems, environments, and/or configurations that may be suitable for use with host (1002) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

The host (1002) may be described in the general context of computer system-executable instructions, such as program modules, being executed by a computer system. Generally, program modules may include routines, programs, objects, components, logic, data structures, and so on that perform particular tasks or implement particular abstract data types. The host (1002) may be practiced in distributed cloud computing environments where tasks are performed by remote processing devices that are linked through a communications network. In a distributed cloud computing environment, program modules may be located in both local and remote computer system storage media including memory storage devices.

Figure 10:
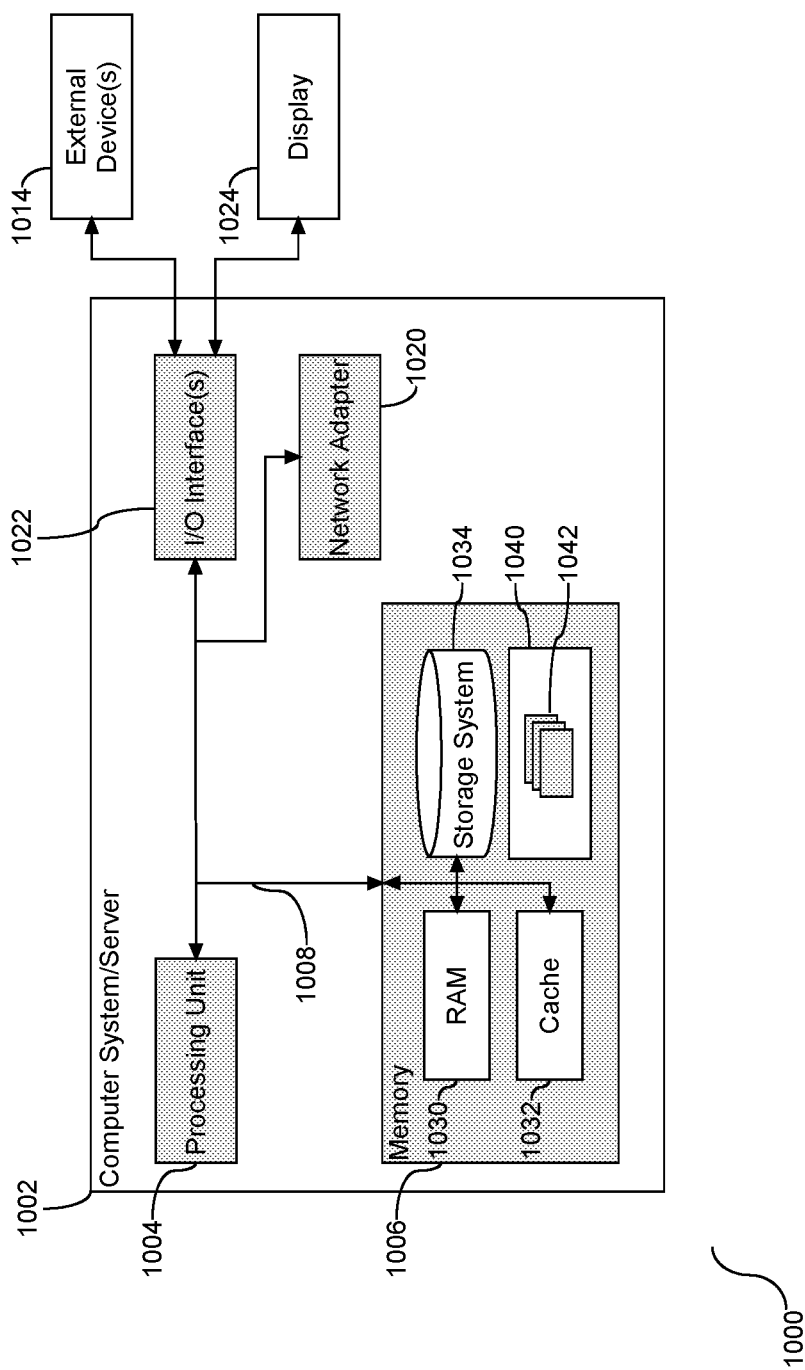
FIG. 10 is a block diagram illustrating an example of a computer system/server of a cloud based support system, to implement the system and process described above with respect to FIGS. 1-9.

As shown in FIG. 10, the host (1002) is shown in the form of a general-purpose computing device. The components of the host (1002) may include, but are not limited to, one or more processors or processing units (1004), a system memory (1006), and a bus (1008) that couples various system components including system memory (1006) to processor (1004). The bus (1008) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (1002) typically includes a variety of computer system readable media. Such media may be any available media that is accessible by the host (1002) and it includes both volatile and non-volatile media, removable and non-removable media.

The memory (1006) can include computer system readable media in the form of volatile memory, such as random access memory (RAM) (1030) and/or cache memory (1032). By way of example only, storage system (1034) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (1008) by one or more data media interfaces.

Program/utility (1040), having a set (at least one) of program modules (1042), may be stored in the memory (1006) by way of example, and not limitation, as well as an operating system, one or more application programs, other program modules, and program data. Each of the operating systems, one or more application programs, other program modules, and program data or some combination thereof, may include an implementation of a networking environment. The program modules (1042) generally carry out the functions and/or methodologies of embodiments to store and analyze data. For example, the set of program modules (1042) may include the modules configured as or be operatively coupled to the controller unit (114) as shown and described FIGS. 1-9. The program module(s) (1042) expands the functionality of the apparatus by expanding the functionality of the ECU (114). Namely, the program module(s) (1042) communicate with the apparatus via the controller unit (114) to expand, or in some cases customize the functionality of the apparatus. For example, in the case of a subject with an orthodontic appliance, one or more missing teeth, and/or an abnormal occlusion, the program module (1042) may be leveraged to process data and provide and communicate a functional protocol for cleaning to the controller unit (114).

The host (1002) may also communicate with one or more external devices (1014), such as a keyboard, a pointing device, etc.; a display (1024); one or more devices that enable a user to interact with host (1002); and/or any devices (e.g., network card, modem, etc.) that enable host (1002) to communicate with one or more other computing devices. Such communication can occur via Input/Output (I/O) interface(s) (1022). Still yet, host (1002) can communicate with one or more networks such as a local area network (LAN), a general wide area network (WAN), and/or a public network (e.g., the Internet) via network adapter (1020). As depicted, network adapter (1020) communicates with the other components of host (1002) via bus (1008). In one embodiment, a plurality of nodes of a distributed file system (not shown) is in communication with the host (1002) via the I/O interface (1022) or via the network adapter (1020). It should be understood that although not shown, other hardware and/or software components could be used in conjunction with host (1002). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (1006), including RAM (1030), cache (1032), and storage system (1034), such as a removable storage drive and a hard disk installed in a hard disk drive.

Computer programs (also called computer control logic) are stored in memory (1006). Computer programs may also be received via a communication interface, such as network adapter (1020). Such computer programs, when run, enable the computer system to perform the features of the present embodiments as discussed herein. In particular, the computer programs, when run, enable the processing unit (1004) to perform the features of the computer system. Accordingly, such computer programs represent controllers of the computer system.

In one embodiment, the host (1002) is a node (1010) of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 11:
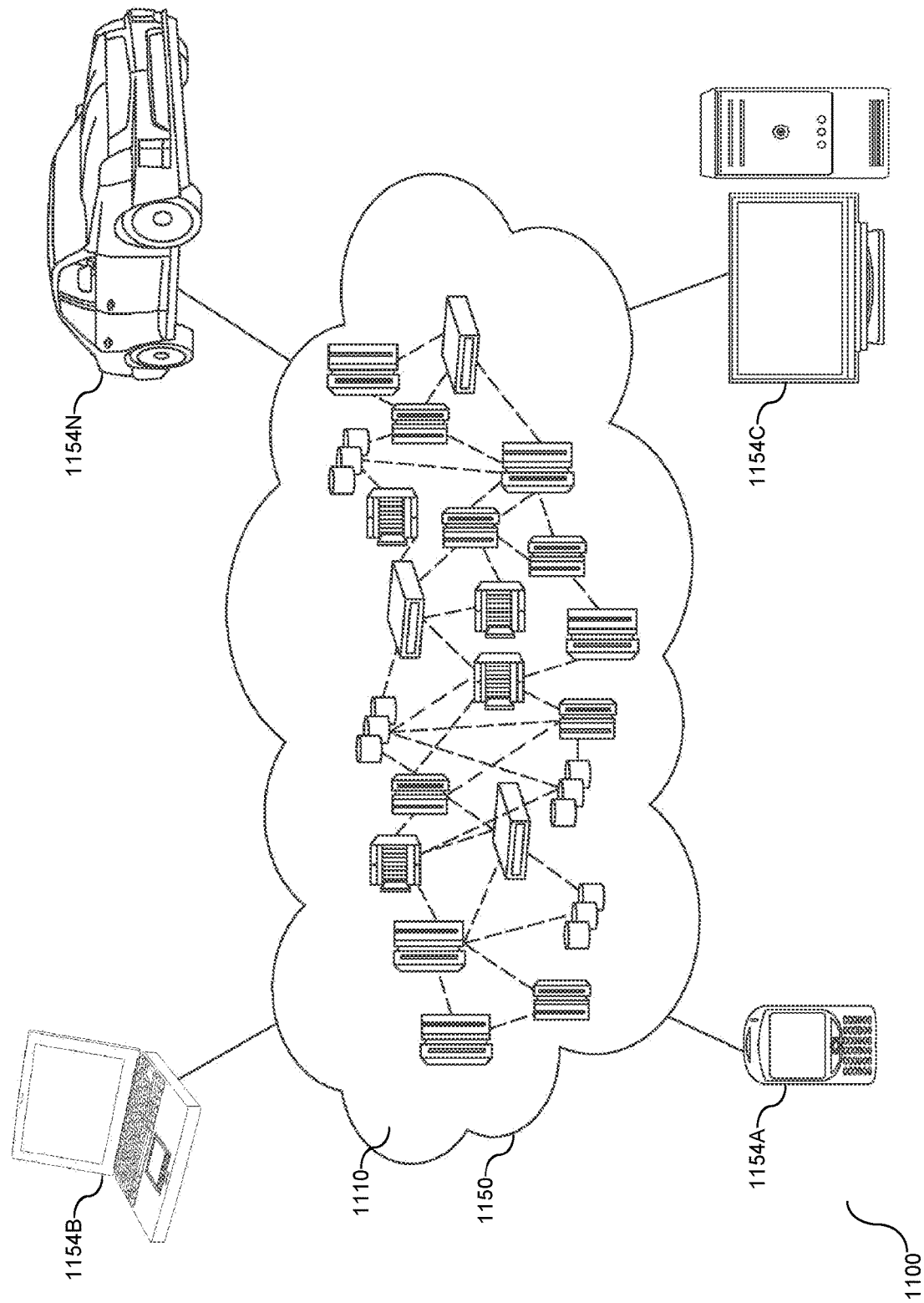
FIG. 11 depicts a block diagram illustrating a cloud computing environment.

Referring now to FIG. 11, an illustrative cloud computing network (1100) is provided. As shown, cloud computing network (1100) includes a cloud computing environment (1150) having one or more cloud computing nodes (1110) with which local computing devices used by cloud consumers may communicate. Examples of these local computing devices include, but are not limited to, personal digital assistant (PDA) or cellular telephone (1154A), desktop computer (1154B), laptop computer (1154C), and/or automobile computer system (1154N). Individual nodes within nodes (1110) may further communicate with one another. They may be grouped (not shown) physically or virtually, in one or more networks, such as Private, Community, Public, or Hybrid clouds as described hereinabove, or a combination thereof. This allows cloud computing environment (1100) to offer infrastructure, platforms and/or software as services for which a cloud consumer does not need to maintain resources on a local computing device. It is understood that the types of computing devices (1154A-N) shown in FIG. 11 are intended to be illustrative only and that the cloud computing environment (1150) can communicate with any type of computerized device over any type of network and/or network addressable connection (e.g., using a web browser).

Figure 12:
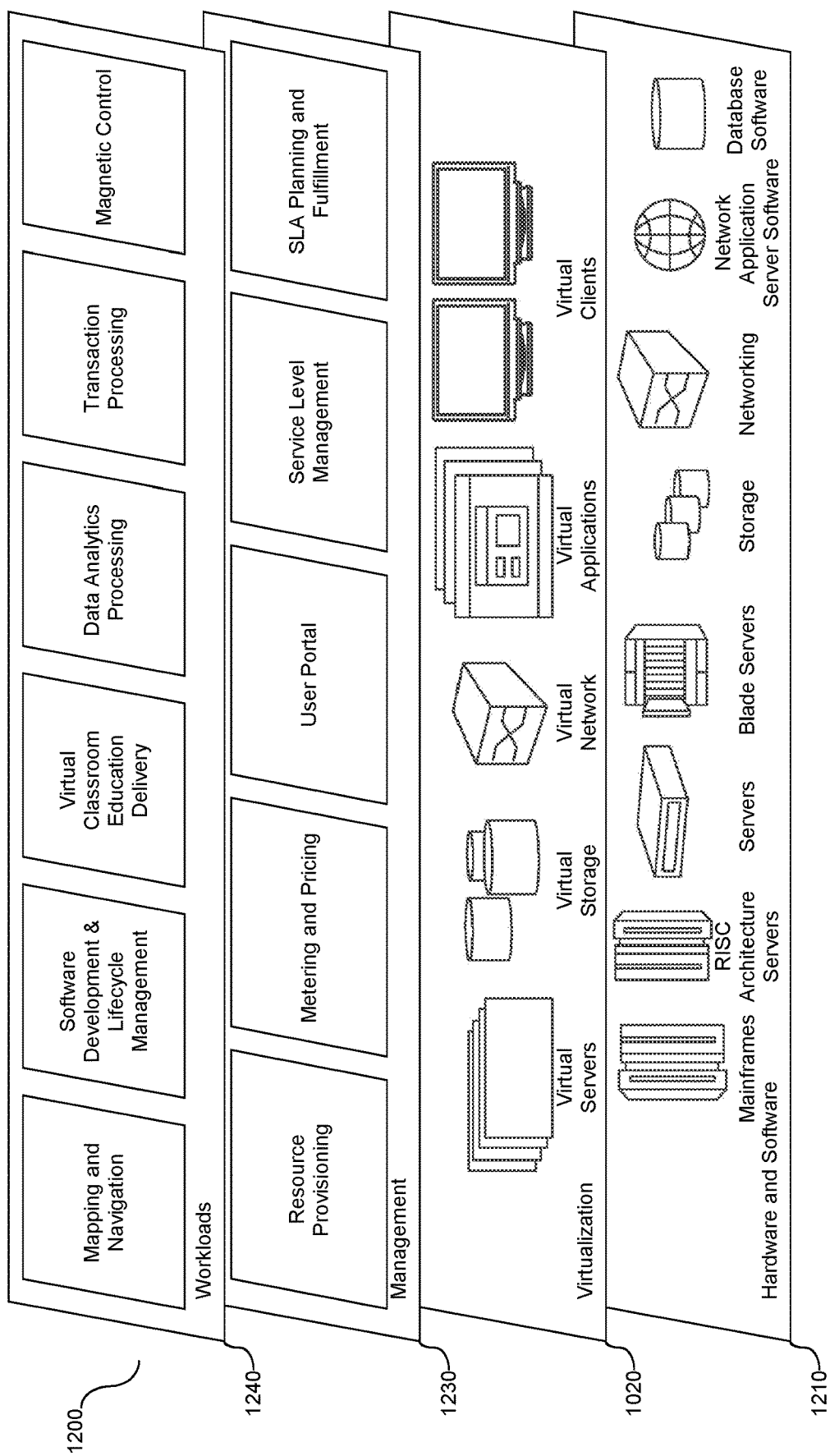
FIG. 12 depicts a block diagram illustrating a set of functional abstraction model layers provided by the cloud computing environment.

Referring now to FIG. 12, a set of functional abstraction layers (1200) provided by the cloud computing network of FIG. 11 is shown. It should be understood in advance that the components, layers, and functions shown in FIG. 12 are intended to be illustrative only, and the embodiments are not limited thereto. As depicted, the following layers and corresponding functions are provided: hardware and software layer (1210), virtualization layer (1220), management layer (1230), and workload layer (1240). The hardware and software layer (1210) includes hardware and software components. Examples of hardware components include mainframes; RISC (Reduced Instruction Set Computer) architecture based servers; networks and networking components. Examples of software components include network application server software; and database software.

Virtualization layer (1220) provides an abstraction layer from which the following examples of virtual entities may be provided: virtual servers; virtual storage; virtual networks, including virtual private networks; virtual applications and operating systems; and virtual clients.

In one example, management layer (1230) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (1240) provides examples of functionality for which the cloud computing environment may be utilized. Examples of workloads and functions which may be provided from this layer include, but are not limited to: mapping and navigation; software development and life-cycle management; virtual classroom education delivery; data analytics processing; transaction processing; and magnetic control. More specifically, the magnetic control enables the workload layer to communication with the ECU (114) and associated function and control of the MCAU and the magnetic members.

The present embodiments may be a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer readable signal medium includes a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium is any computer readable medium that is not a computer readable storage medium and that can communicate, propagate, or transport a program for use by or in connection with an instruction execution system, apparatus, or device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single dataset, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of the disclosed embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated. A magnetically controlled abrasive system utilizing a magnetic system manipulates a magnetically controlled abrasive unit to efficiently and effectively abrade a surface.

It will be appreciated that, although specific embodiments have been described herein for purposes of illustration, various modifications may be made without departing from the spirit and scope of the embodiments. In particular, the body may be in a variety of different configurations. In one embodiment, a plurality of different MSs may be used to control the movement of multiple magnetically controlled abrasive units. Additionally, the surfaces abraded should not be considered limiting as a variety of different surfaces could be abraded. Accordingly, the scope of protection of these embodiments is limited only by the following claims and their equivalents.

What is claimed is:
1. An apparatus comprising:
a first body comprising: a first unit to configured to generate a first magnetic field;
a first track member operatively coupled to the first unit, the first track member to facilitate movement of the first unit along the first body;
a second body positioned proximal to the first body, the second body operatively coupled to the first body via the first magnetic field, wherein the second body is physically positioned apart from the first body and configured to react to the generated first magnetic field, the reaction of the second body to interface with one or more dentition landmarks when in use, the second body comprising:
  at least one abrasive protrusion operatively coupled to a first surface of the second body;
a control unit electrically coupled to the first body, the control unit configured to:
  communicate a first electrical signal to the first body, the first electrical signal to control movement of the first unit along the first track member; and
wherein the movement of the first unit controls movement of the operatively coupled second body including movement and interface of the at least one abrasive protrusion with respect to the one or more dentition landmarks.

2. The apparatus of claim 1, further comprising:
a second track member positioned proximal to the first track member within the first body;
the first body having a second unit configured to generate a second magnetic field;
the second track member operatively coupled to the second unit, the second track member to facilitate movement of the second unit along the first body;
the second body operatively coupled to the first body via the second magnetic field, and configured to react to the generated second magnetic field, the reaction of the second body to interface with one or more dentition landmarks; and
the control unit further configured to communicate a second electrical signal to the first body, the second electrical signal to control movement of the second unit relative to the second track member responsive to receipt of the second electrical signal, wherein movement of the second unit is configured to control movement of the operatively coupled second body and interface of the at least one abrasive protrusion with in the one or more dentition landmarks.

3. The apparatus of claim 2, wherein the first unit further comprises:
a first base operatively coupled to a first solenoid, and the first base causing the first unit to move along a first track and the first solenoid configured to rotate about the first base.

4. The apparatus of claim 3, wherein the second unit further comprises:
a second base operatively coupled to a second solenoid, and further comprising interaction of the second unit with the first unit, including rotation of the first solenoid with rotation of the second solenoid responsive alignment of the first and second units.

5. The apparatus of claim 2, wherein the first body is configured to generate a first magnetic field responsive to receipt of the first electrical signal, and the third body is configured to generate a second magnetic field responsive to receipt of the second electrical signal.

6. The apparatus of claim 2, further comprising the generated first and second magnetic fields configured to control the second body, wherein change of at least of the first and second magnetic fields causes a position or orientation change of the second body.

7. The apparatus of claim 2, further comprising at least one magnet embedded in the second body, the generated first and second magnetic field to exert a magnetic force on the second body, the magnetic force including an attractive force and a repelling force.

8. The apparatus of claim 1, wherein the first unit is an electromagnet.

9. The apparatus of claim 1, wherein the second body has a spherical shape.

10. The apparatus of claim 1, wherein controlling movement of the second body is in at least three degrees of freedom.

11. The apparatus of claim 1, wherein the second body is comprised of a flexible material.

* * * * *